Patented June 20, 1939

2,162,863

UNITED STATES PATENT OFFICE 2,162,863

STABLE PRODUCTS SHORTENING THE BLEEDING PERIOD

Otto Ripke and Karl Döttl, Wuppertal-Elberfeld, Germany, assignors to Winthrop Chemical Company, Inc., New York, N. Y., a corporation of New York No Drawing. Application July 7, 1936, Serial No. 89,460. In Germany July 12, 1935

5 Claims. (Cl. 167—74)

This invention relates to a process for the preparation of a stable product therapeutically useful in relation to bleeding and to a process for preparing the same.

In accordance with the present invention a stable product influencing bleeding, and in particular shortening the bleeding period, is obtained by a process the essential steps of which consist in obtaining from the spinal cord or brains of mammals juices containing the active components of the cells and drying said juices under sterile conditions.

Such juices are, for instance, pressed juices or extracts obtained from the spinal cord or brains of mammals.

The initial organs are preferably taken from slaughtered animals, particularly young slaughtered animals, for instance, bovine animals and pigs. We prefer the spinal cord or brains from calves.

If possible, the organs are freed from the thin, often blood-stained membranes. After the initial materials have been comminuted they are preferably triturated, for instance with quartz sand and/or kieselguhr in order to destroy the cell walls.

The pressed juice is obtained in the usual manner, for instance, by pressing the triturated organs in the Buchner-press under high pressure. Before further working up the pressed juice is advantageously purified by centrifuging and/or filtering and, if desired, sterilized for instance by germ filtration.

For the preparation of extracts from the spinal cord or brains of mammals the said organs are advantageously extracted with aqueous solutions. There may be instanced water, aqueous solutions of salts advantageously containing not more than 10% of salt, or mixtures of water with water-miscible organic solvents. Suitable salt solutions are, for instance, sodium chloride, potassium chloride, ammonium chloride, magnesium chloride, calcium chloride, sodium sulfate, ammonium sulfate, sodium phosphate and ammonium phosphate solutions. For the extraction with a salt solution we prefer a sodium chloride solution. The extract thus obtained may immediately be dried, and for the therapeutic administration it is only necessary to take up the residue with such an amount of distilled water that the content of sodium chloride of the solution obtained amounts to that of a physiological sodium chloride solution. As water-miscible organic solvents there come, for instance, into consideration the lower aliphatic alcohols, such as methanol, ethanol, isopropanol, or water-soluble ketones, such as acetone or methyl-ethyl ketone. Also watersoluble organic bases such as pyridine, dimethylamine and diethylamine may be employed. An extraction with a 50% aqueous ethyl or methyl alcohol has proved to be particularly advantageous. When carrying out the extraction with aqueous liquids containing water-soluble salts and/or water-miscible organic liquids the dissolution of the ballast substances accompanying the active principle shortening the bleeding period is prevented or at least strongly diminished.

The extract which has been obtained, for example by decantation or centrifuging is previously clarified, for instance, by another centrifuging and/or a filtration and then, if desired, sterilized by filtration through a bacteria retaining filter prior to drying under sterile conditions.

It has further been found advantageous to remove the coagulable proteins in the pressed juices or extracts before drying the same. The coagulable proteins may be precipitated, for instance, by heating to the coagulation temperature of about 80° C. or by adding water-miscible highly concentrated organic liquids such as methanol, ethanol, isopropanol or acetone. Also concentrated salt solutions, such for instance, as concentrated solutions of sodium chloride, potassium chloride, ammonium sulfate, magnesium chloride and sodium sulfate may be employed. Care is to be taken that only such an amount of the precipitating agent is added that the coagulable proteins but not the active principle is precipitated. The precipitate of the coagulable proteins is removed from the solution in the usual manner, for instance, by decantation, filtration or centrifuging. The filtrate is preferably freed from the precipitating agent before further working up. If the precipitation has been effected by means of concentrated salt solutions the salts may be removed from the filtrate, for instance, by dialysis. In certain cases, for instance, if a concentrated magnesium chloride solution has been used for the precipitation the salt may also be removed from the filtrate by precipitation, in this special case, for instance, by means of ammonium phosphate. If water-miscible organic liquids have been used for the precipitation of the coagulable albumens the solvents may be distilled off advantageously under reduced pressure and at low temperatures.

Drying under sterile conditions has proved to be particularly important for the reason that the active principle is not stable in the pressed juices or extracts. In order to avoid any decomposition of the active principle drying is preferably carried out under reduced pressure advantageously in high vacuo and at low temperatures, for instance, 15–30° C.

A preferred embodiment of the present invention consists in subjecting the juices containing the active components of the cells of the spinal cord or brains of mammals to a precipitation with water-miscible solvents and subsequently extracting the precipitates with aqueous solvents prior to drying under sterile conditions.

As water-miscible organic solvents suitable for precipitating the pressed juices or extracts there may be mentioned methanol, ethanol, propanol, acetone, methyl-ethyl ketone, dioxane and pyridine. The extraction of the precipitate which has been separated, for instance by filtration and/or centrifuging, can be carried out with the same agents as are employed for the preparation of the extracts of spinal cord and brain. Also in this case we prefer a 50% aqueous alcohol which may contain small amounts of watersoluble salts advantageously sodium chloride.

Prior to further working the solution obtained in the extracting process is preferably freed from the organic solvents still present by means of distillation advantageously under reduced pressure and at low temperatures. Any dissolved salts may be removed, for instance, by dialysis or precipitation. The solutions obtained may be sterilized, for instance, by filtration through a bacteria retaining filter.

For the precipitation of the pressed juices or the extracts the water-miscible organic solvent is added in such an amount that the substance or substances shortening the bleeding period as well as the ineffective accompanying materials, such as proteins and blood pigments, are precipitated. By treating the precipitate with aqueous liquids the substance or substances shortening the bleeding period are elutriated from the precipitate and thus separated from the ballast materials, i. e. the active principle is obtained in a very pure state.

The product obtained in accordance with the afore-given directions is in general slightly yellow colored and soluble in water and aqueous liquids. It is insoluble in anhydrous organic solvents. In the dry form it is stable on storage particularly if air is excluded, provided that sterile conditions are always maintained. It is distinguished by the property of influencing the bleeding period, particularly of shortening it.

For determining this effect a mouse is 3 times injected with 0.35 ccm. each of a physiological sodium chloride solution containing 2% of the above described dry product. Within 3 days after the first injection the tail of the mouse is punctured viz. cut off while dipping it into a Ringer solution. The bleeding period is determined and compared with the bleeding period measured on the punctured viz. cut off tail of an untreated mouse. In general the bleeding period is shortened for about 40 to 45% when proceeding in the above-described manner.

The product obtained in accordance with the present invention shall be employed in therapy.

The following examples illustrate the invention without limiting it thereto.

*Example 1*

1 kg. of spinal cord or brain from ox or calf which is freed from skin and blood is triturated after comminution in a mincing-machine with half the weight of quartz sand mixed with one third of its weight of kieselguhr and pressed in the Buchner-press under 300 to 400 atmospheres. The yield of pressed juice amounts to 45%. The pressed juice is purified by centrifuging and dried under sterile conditions in ampoules in high vacuo.

*Example 2*

1 kg. of spinal cord or brain is worked to pressed juice as indicated in Example 1. The pressed juice is heated to about 80° C. until coagulation is complete. The solution which is separated from the coagulate by centrifuging is purified by centrifuging and dried under sterile conditions in ampoules under strongly reduced pressure.

*Example 3*

From 1 kg. of brain or spinal cord pressed juice is obtained as indicated in Example 1. The latter is treated with such a quantity of alcohol that the albumen is completely precipitated. After separation of the precipitated albumen by filtration the filtrate is evaporated under reduced pressure at body temperature, until the alcohol is removed. The resulting aqueous solution is purified and dried under sterile conditions in ampoules under reduced pressure.

*Example 4*

Spinal cord or brain from ox or calf which material is freed from skin and blood is carefully comminuted and shaken with a 0.9 to 3% sodium chloride solution. The undissolved residue is removed from the mixture by centrifuging and the turbid extraction liquid is, after several clarifications, dried under sterile conditions in ampoules.

*Example 5*

A pressed juice from spinal cord or brain is mixed with more than 60% of its volume of anhydrous ethanol. The precipitate thus obtained is separated by filtration and taken up with so much physiological sodium chloride solution as corresponds to the original volume of the pressed juice. The ethanol still present is removed from the mixture by distillation under reduced pressure. Any ballast material still present, such as the blood pigment which has been denatured by the addition of the alcohol, is separated. After removal of the salt, the weakly colored solution is subjected to filtration through a bacteria retaining filter and dried in ampoules in high vacuo.

We claim:

1. In the process for the preparation of a stable product shortening the bleeding period the steps which comprise extracting organs selected from the group consisting of the spinal cord and brain of mammals with an about 50% aqueous alcohol and drying the extract obtained under sterile conditions.

2. In the process for the preparation of a stable product shortening the bleeding period the steps which comprise obtaining from organs selected from the group consisting of the spinal cord and brains of mammals juices containing the active components of the cells, subjecting these juices to a precipitation with water-miscible organic solvents in such an amount that both the active principle and the accompanying ballast substances are precipitated, subsequently extracting the precipitate with aqueous solvents and drying the juices obtained under sterile conditions.

3. In the process for the preparation of a stable product shortening the bleeding period the steps which comprise obtaining from organs selected from the group consisting of the spinal cord and brains of mammals juices containing the active components of the cells, subjecting these juices to a precipitation with water-miscible organic solvents in such an amount that both the active principle and the accompanying ballast substances are precipitated, subsequently extracting the precipitate with aqueous liquids containing substances preventing the dissolution of the ballast materials, which substances have been selected from the group consisting of water-soluble salts and water-miscible organic solvents, and drying the purified juices under sterile conditions and reduced pressure, and at low temperatures.

4. In the process for the preparation of a stable product shortening the bleeding period the steps which comprise obtaining from organs selected from the group consisting of the spinal cord and brains of mammals juices containing the active components of the cells, subjecting these juices to a precipitation with water-miscible organic solvents in such an amount that both the active principle and the accompanying ballast substance are precipitated, subsequently extracting the precipitate with an about 50% aqueous alcohol, and drying the purified juices under sterile conditions and reduced pressure, and at low temperatures.

5. A therapeutically useful product which is soluble in water, insoluble in anhydrous organic solvents, stable on storage under sterile conditions and shortens the bleeding period for about 40 to 45% measured on the tail of a mouse 3 times injected with 0.35 ccm. each of a physiological sodium chloride solution containing 2% of the dry product, said product being obtained by the process of claim 1.

OTTO RIPKE.
KARL DÖTTL.